United States Patent Office 3,164,643
Patented Jan. 5, 1965

3,164,643
POLYSULFIDE PRODUCT AND METHOD OF
PREPARING THE SAME
Bruce W. Hubbard, Oak Park, Ill., assignor to Ideal Roller
and Manufacturing Company, Chicago, Ill., a corporation of Illinois
No Drawing. Filed Nov. 15, 1960, Ser. No. 69,271
17 Claims. (Cl. 260—830)

This invention relates to the preparation of compositions comprising predominantly cross-linked polysulfide polymer and to improved methods of preparing the same. More particularly, it relates to the maunfacture of novel elastomeric compositions having especial utility in the lithographic industry and to rapid, low temperature reactions whereby the same are produced. While the application of the compositions described to the lithographic field, e.g., as roller surfaces and in blankets, is a very important one, and, indeed, that to which the following description will be particularly directed, it should be understood that these compositions are generally useful wherever tough, chemically resistant, resilient compositions of the type described are desired.

For many years a large part of inking rollers employed by the lithographic industry have been prepared from the reaction product of an unsaturated vegetable oil and sulfur monochloride. The product employed is essentially the same in chemical composition as that comprising the well-known "art gum" erasers in use over the years. For a detailed description of a particularly desirable method of producing such inking rollers, reference is made to Wolever Patents 1,161,756 and 1,318,502. In these patents is described a method for producing inking rollers wherein as a first step a molten low-temperature fusible substance, such as paraffin wax, is introduced into a horizontally disposed, rotating, tubular mold to effect a deposit of a very thin wax cylinder on the inside surface of the mold. Upon hardening of the wax, vegetable oil and an amount of sulfur chloride sufficient to cure the same are admixed and introduced to the rotating mold to produce concentrically within the wax cylinder a relatively thin layer of sulfurized vegetable oil. The mold is then removed from the rotating lathe, placed upright so that a steel shaft may be disposed centrally therein and a second batch of vegetable oil and sulfur monochloride is poured between the shaft and the layer of sulfurized vegetable oil. Once the material poured around the exterior of the steel shaft has been polymerized, heat is applied to the exterior of the mold to melt the wax and the roller is removed.

This method of producing inking rollers has been eminently successful over the years. It is a very economical and readily performed technique requiring a minimum of investment in equipment and permitting the utilization of low cost molds. For many years the inking rollers prepared from vulcanized vegetable oil have been satisfactory but with the advent of larger presses, and greater demands on the surface of the rollers, the easily damaged surface of sulfurized vegetable oil rollers have not been entirely satisfactory under all conditions. A very serious difficulty which has arisen in recent years is the attack of the roller surfaces by the solvents in modern inks. Such solvents have caused swelling and consequent weakening of roller surfaces heretofore used. A considerable amount of effort has been exerted, therefore, to develop a more permanent solvent and damage-resistant surface for inking rollers which, nevertheless, afford the same desirable properties so far as their intended use is concerned.

Rollers for this purpose must have good chemical resistance to the solvents and printing inks encountered in normal printing operations. Moreover, they must have the physical characteristics similar to that obtained by vulcanizing a vegetable oil, yet be more long-lasting and able to withstand impacts and rough treatment to a very substantially greater extent. In the course of research, a number of resinous or plastic materials have been tried, either combined with sulfurized vegetable oil or as such; for one thing, however, the reactivity of sulfur monochloride with most organic polymers and the monomers from which they are polymerized has prohibited any such combination which was commercially useful.

Applicant has discovered that highly useful elastomeric compositions comprising polysulfide polymers of the type hereafter described in detail can be produced by subjecting such polysulfide to reaction in the presence of certain catalysts such as tellurium dioxide and selenium dioxide. In accordance with the preferred method hereof there is also included in the reaction mix a primary or secondary amine. The function of the amine appears to be that of activating the metal oxide to catalyze a cross-linking reaction of the polysulfide polymer. When the amine is present the reaction may be carried out much more rapidly and at lower temperatures. In preparing an elastomer which has shown particularly valuable properties as the surface of an inking roller, the reaction mixture preferably comprises, in addition to polysulfide, catalyst, and amine, a minor amount of m-dinitrobenzene, which serves the dual function of further enhancing the rate of reaction and reduced surface tension of the mix to permit release of entrapped gases, thereby assuring avoidance of porosity of the finished product, small amounts of epoxy resin and a filler such as $TiO_2$. It has been found desirable also to slurry the catalyst in a solvent, e.g., dibutyl phthalate, prior to combining the same with polysulfide.

It is known, of course that liquid polysulfide polymers have been treated to produce products varying in their physical properties over a relatively wide range. And, it has been taught that certain amines may be employed to promote the reaction of such materials. However, it has been found by the present applicant that amines alone to promote the formation of the composition of the present invention and tertiary amines have proven wholly ineffective for the purpose. Only primary and secondary amines have proven useful in accordance herewith.

In accordance with the preferred method of preparing the elastomeric compositions useful for inking surfaces, there is added to the reaction mix a filler or strengthening agent and a minor quantity of a substituent adapted to assure uniform dispersion of the filler. The preferred substituent for this purpose is an epoxide polymer although chlorinated hydrocarbons, e.g., Aroclor 1254, a material prepared by chlorinating biphenyl to the point that the chlorine content is 54% and the molecular weight is 326.5 thereby affording a liquid chlorinated viscous hydrocarbon oil having a specific gravity of 1.538–1.548, a distillation range of 365–390° C. and an acidity in milligrams of KOH per gram of 0.01, has proven useful for the purpose. In this connection, it has been found that in the absence of either catalyst or amine the epoxy and polysulfide will undergo some form of reaction at room temperature, but only after more than about 24 hours. The product which results, is similar in appearance to asphalt. It is non-elastic and exhibits cold flow. Heating these same materials to about 167° F. accelerates the reaction but the product is still asphaltic and non-elastic in appearance. Addition of an amine speeds up the reaction at room temperature and may have some slight effect on the rate of reaction but the product formed is indistinguishable from that prepared without the amine. On the other hand, either the polysulfide alone or the mixture of epoxy and polysulfide will, in the presence of a metal oxide such as $TeO_2$, afford a resilient elastomer of the type to which this invention is directed at room temperature. However, from 24 to 72 hours are required.

Heating the polysulfide, either alone or in combination with the aforementioned ingredients, in the presence of the oxide catalyst to about 167° F. results in the desired elastomer in from about 30 minutes to one hour. When, however, such reactants are admixed with the oxide, e.g., TeO$_2$, and an amine of the type described herein the tough elastomers of the present invention are obtained at room temperature in from a few seconds to about 30 minutes, depending upon the selected amine. Heating such a reaction mixture, of course, tends to speed the reaction even more but such is usually unnecessary and can be quite undesirable in certain applications.

The present invention is particularly important in the lithographic roll manufacturing industry because it enables operators in that industry to continue the use of the same equipment and of almost identical processing techniques as those employed for years in conjunction with the sulfurized vegetable oil type of inking roller. Of prime importance in developing a composition as a substitute for the sulfurized vegetable oil roller has been the necessity of having a composition which can be produced rapidly at room temperature. As indicated above, the polysulfide polymer alone or with epoxy, either with or without an amine, will afford an asphaltic reaction product when the reactants are heated to a temperature of, for example, about 75° to 170° C. A chlorinated hydrocarbon such as Aroclor 1254 has been substituted for epoxy resin with similar results. If a catalyst such as tellurium oxide is present, however, the desired elastomer may be obtained (in the absence of amine) in about 24 hours or in a considerably shorter time if heat is applied. While this vastly speeded reaction is itself a very real contribution to this art, such temperatures or reaction times are not adaptable to the current processing methods in the inking roller manufacturing business where the process such as that described in the aforementioned Wolever patents is employed and setting up to the desired elastomers in a few minutes is required. Some prior teachings suggest that room temperature cross-linking or cure of polysulfides with or without epoxies may be carried out in the presence of amines. It has been found that when reacting the same in the proportions disclosed herein such low temperature reaction can either not be effected at all or if made to proceed takes hours or days to reach a complete cure. On the other hand, by the instant process novel and highly useful compositions may be prepared in a matter of seconds or minutes at room temperature.

Briefly, compositions of the present invention are prepared by subjecting a liquid polysulfide polymer of the type hereinafter defined in detail (a useful commercial product is that marketed under the trade name "Thiokol Liquid Polymer LP-3") to reaction conditions in the presence of a minor amount of an oxide of an element of the right-hand side of Group VI of the Periodic Table, e.g., the oxides tellurium or selenium, and a primary or secondary amine. Preferably, there is added to the reactants for the purpose of reenforcing the ultimate product an amount of a filler such as titanium dioxide or equivalent powder, e.g., zinc oxide, carbon black, etc., and a minor amount of a material capable of assuring uniform dispersion of the filler throughout the reaction mix and final product. For this purpose an epoxide polymer or a chlorinated hydrocarbon, e.g., Aroclor 1254, has been found especially useful. It is also preferred that a relatively minor amount of m-dinitrobenzene or equivalent solvent be added to the reaction mix for the purpose of lowering the surface tension of the mix to permit entrapped gases or air to readily be released and thereby decrease porosity of the finished product. It has been found that the presence of m-dinitrobenzene also affords somewhat more rapid reaction. The m-dinitrobenzene is generally employed in amounts substantially less than the amount of the particulate filler, the latter generally being less than about one-fifth of the combined weight of polyepoxide and polysulfide.

In accordance with the method of producing a preferred composition of the present invention, a mixture of polysulfide, titanium dioxide, dinitrobenzene and epoxy resin, which for purposes hereof may be referred to as Part A of the reaction mixture, is first prepared. In Part A the polysulfide to epoxide ratio comprises about 33 parts by weight to 1, the titanium dioxide comprises a little more than one-tenth the weight of polysulfide and the m-dinitrobenzene is about one-third the weight of titanium dioxide. The tellurium dioxide, in an amount about equal to that of the epoxy resin in Part A is admixed with a minor amount of a suitable dispersing liquid for the tellurium dioxide. Dibutylphthalate has been found to be particularly useful as a dispersing liquid but any equivalent material may be employed if desired.

Part B, i.e., the tellurium dioxide and dibutylphthalate, in a preferred embodiment, is equal to about one-tenth the weight of Part A with which it is mixed. These two parts may be combined without initiation of the exothermic reaction which characterizes the ultimate formation of the novel elastomers of the instant invention. Indeed, in practice it is preferred that Part A and Part B be thoroughly admixed some time prior to that when it is desired to effect the cure. A mixture of A and B without amine has a stable life of as much as 5 to 8 hours. Once the amine is added to the admixture of Parts A and B the exothermic reaction begins almost immediately and goes rapidly to completion at room temperature without application of additional heat. The reaction is usually completed in 5 to 10 minutes or less.

The amount of amine present in the reaction mixture has been found to have an effect upon the rate of reaction and the amount of heat produced. As might be expected, the larger the quantities of Parts A and B, the greater is the heat produced in the exothermic reaction. And the greater is the heat produced in a short period from a given quantity of reactions. It has been found, when producing inking rollers from the disclosed composition, that when pouring the inner core around the steel shaft and within the concentric shells of centrifugally cast wax and polymer, that the insulating effect of these concentric layers is considerable. It is preferred, therefore, to employ proportionally less amine in the material poured into the vertical mold than is employed in the centrifugal casting of the outer layer. Thus, for example, the proportion of amine in preparing the outer shell of centrifugally cast material has been found to preferably be from about 2.8% to about 4.5%. It will be understood, of course, that one skilled in the art may find that a somewhat greater or lesser quantity may be preferred in a given situation. In a typical example, where the weight percent of Part A comprises 92.5% and Part B the remainder, the amine has been employed in the amount of 3.8% to produce the outer centrifugally cast shell, but when employing the same composition for the inner portion of the roller the amine has preferably been reduced to about 2% in order to offset the insulating effect in the outer core. This amount of amine may also be varied in either direction, depending upon the circumstance of a given application, e.g., the amount of reactants, the nature of the mold, the thickness of the outer shell, etc.

As noted above, the catalyst employed for the purpose of activating the reaction of polysulfide polymer and epoxy resin is preferably tellurium oxide. While amines have been employed in the activation of epoxies and the art suggests that amines may be employed successfully in copolymerization reactions between polysulfide polymers and epoxy resins, the present applicant has found that amines, per se, are ineffective in any reasonable period of time to promote the hereindescribed reaction at room temperature to produce an elastomeric composition.

The polysulfide polymers which are preferred for use in accordance herewith are those thiol-terminated liquid polymers whose average general structure may be represented as follows:

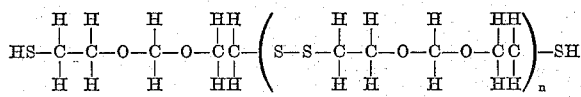

wherein $n$ is an integer from about 3 to about 26 and preferably from about 4 to 12. Products of this type are sold commercially under the trade names LP-2, LP-3, LP-8, etc. The preparation of such polymers and of like polymers having utility in accordance herewith is described in Industrial Engineering Chemistry, vol. 43, page 324 (1951), in U.S. Patents Nos. 2,402,977 and 2,466,963 to Patrick et al. and Fettes et al., and Patent No. 2,789,958 to which reference is made for purposes of the present disclosure. The published properties of the polymers LP-2 and LP-3 are as follows:

|  | Polymer LP-2 | Polymer LP-3 |
| --- | --- | --- |
| Physical state at room temp | Mobile liquid | Mobile liquid. |
| Color | Clear, amber | Clear, amber. |
| Viscosity at 25° C., poises | 350-450 | 7-12. |
| Average molecular weight (approx.) | 4,000 | 1,000. |
| Specific gravity, 20°/4° C | 1.27 | 1.27. |
| Refractive index, $n_D{}^{25}$ | 1.5689 | 1.5649. |
| Pour point, ° F | 35 | −15. |
| Flash point (open cup), ° F | 450 | 418. |
| Fire point (open cup), ° F | 475 | 465. |
| Moisture content, percent | 0.2 max | 0.1 max. |
| pH (water extract) | 6.0-8.0 | 6.0-8.0. |
| Composition, mole percent: |  |  |
| Bis (2-chloroethyl) formal | 98 | 98. |
| Trichloropropane | 2 | 2. |

The epoxy resins found especially suitable for use in accordance herewith have the average general formula:

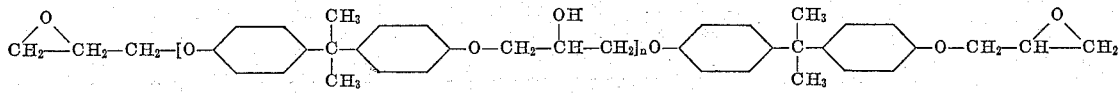

wherein $n$ is an integer from 1 to about 20. The epoxy resins which are utilized in accordance herewith are, of course, known materials and not, per se, the invention of the present applicant. The typical properties of a variety of commercial epoxy resins are as follows:

| Epoxy resin | Physical state at room temp. | Melting point,[a] ° C. | Viscosity (Gardner-Holdt) | Epoxide equivalent |
| --- | --- | --- | --- | --- |
| Epon 828 | Viscous liquid | 8-12 | $Z_5$-$Z_6$+ | 190-210 |
| Epon 1001 | Solid | 53-76 | C-G | 450-525 |
| Epon 1004 | ----do---- | 95-105 | Q-U | 870-1,025 |
| Epon 1007 | ----do---- | 127-133 | Y-$Z_1$ | 1,550-2,000 |
| Araldite CN-501 | ----do---- | 55-61 | D-E | 385-445 |
| Araldite CN-5001 | ----do---- | 80-92 | J-M | 620-770 |
| Araldite KD-339 | ----do---- | 115-130 | $Z_2$-$Z_4$ | 1,150-1,450 |
| Araldite CN-503 | Viscous liquid |  | $Z_6$-$Z_7$ | 205-235 |
| Araldite CN-504 | Liquid |  | T-V | 240-270 |
| Epiphen ER-823 | Very viscous liquid |  | $Z_7$+ | 220 |
| Bakelite BR-18794 | Viscous liquid |  | $Z_4$-$Z_6$ | 185-200 |

[a] Durrans' mercury method.

It is preferred to employ those epoxy resins which are liquid at room temperature and have a viscosity at room temperature (25° C.) of from about 1 to about 100 poises. The more viscose liquids and solids may be employed if first heated or melted, as the case may be, prior to blending with the polysulfide, but such additional processing step may be eliminated in accordance with the preferred embodiment hereof when an epoxy having the above general formula wherein $n$ averages about 5, and the viscosity at 25° C. is from about 100 to 160 poises and the epoxide equivalent (grams of resin containing one gram-equivalent of epoxide) is about 180–195.

The amines which have been found useful in accordance with the present invention are those primary and secondary amines in which the molecular weight divided by the number of active hydrogens falls in the range of from about 15 to about 200, and preferably below about 175. Those amines for which this quotient is less than about 36 cause the reaction to occur very rapidly whereas those for which it is above about 175, and particularly above 200, the reaction is either undesirably slow or, indeed, does not proceed at room temperature in even from one to twelve hours.

Examples of amines which in conjunction with a metallic oxide of the type described afford the desired reaction at room temperature in a matter of minutes to produce the compositions of the present invention are n-butyl amine, t-butyl amine, amyl amine, benzyl amine, dipropyl amine, dibutyl amine and diamyl amine. An amine which in combination with tellurium dioxide did not effect a cure in one hour at room temperature is di-2-ethyl hexyl amine. With such amine the cure was complete in twelve hours. With alkyl amine and various poly amines the reaction proceeded too rapidly for practical use in casting of articles such as printer's rolls, the reaction being complete in less than about thirty seconds, beginning at room temperature. The product produced using such an amine was quite satisfactory, however, but the cure was completed before casting could be completed. Those amines having the quotient of molecular weight divided by active hydrogens falling in the range of from about 36 to about 160 were effective to complete the cure in not more than about three minutes and yet not less than about a minute and one half. The amine is employed in accordance herewith in an amount of from about 2 to 6% and preferably about 4% by weight. Somewhat greater amounts of both amine and catalyst may be employed than is herein suggested, but it is usually uneconomical to do so and no advantage is attained. As noted previously, when making inking rolls by the described process it has been found desirable to employ a lesser quantity of amine in the center section than in the centrifugally cast outer shell.

The relative amounts of epoxy resins, chlorinated hydrocarbon or equivalent and polysulfide brought together in accordance herewith to form those elastomeric compositions in which the expoxy, chlorinated hydrocarbon or equivalent is employed may vary from about 1 part by weight of epoxy or equivalent to about 100 parts by weight of polysulfide to about 1 part of epoxy or equivalent to about 15 parts of polysulfide, but is preferably in the range of from about 1 to 25 to about 1 to 40 parts of epoxy or equivalent per part of polysulfide, respectively. In general terms, the weight ratio of polyepoxide to polysulfide present in the reaction mixture may range from about 0.005 to about 0.1.

Thus, for example, on the basis of 100 parts in the reaction mixture the polysulfide should comprise from about 70 to 90%, and preferably about 80%; the epoxy or equivalent will comprise from about 0.8% to about 5% and preferably about 2.5%. The filler should comprise from about 5 to 25% and preferably from about 10 to 12%, the catalyst from about 1% to about 3.5% or more and preferably about 2.5%, and the amine from about 2% to about 6% and preferably about 4%. The principal purpose of the epoxy, chlorinated hydrocarbon, or equivalent is to aid in maintaining the filler in suspension and to avoid thixotropy.

For purposes of illustration and not of limitation there is set forth below an example of the preparation of an elastomer of the present invention.

*Example 1*

Based upon the final reaction mixture, equalling 100 parts by weight, including polysulfide, epoxy, amine, oxide, filler, solvents, etc., Part A of the final reaction mixture was first prepared comprising 75.20 parts by weight of a commercial polysulfide polymer known as Liquid Polymer LP-3, 11.30 parts of titanium dioxide filler, 3.75 parts of m-dinitrobenzene and 2.25 parts of a commercial epoxy resin known as Epon 828. These components were mixed thoroughly and Part B was prepared comprising 2.47 parts of $TeO_2$ and 1.23 parts of dibutyl phthalate which were also mixed together to form a paste. Parts A and B were then mixed together preparatory to carrying out the cure.

The mold, a length of pipe about five feet in length and about five inches in diameter was placed in a special horizontal lathe and rotation was begun. A wax liner was first laid down on the inside of the mold by introducing molten paraffin wax into one end while applying cooling water to the exterior of the mold. ⅜ part of tertiary butyl amine were then admixed with the mixture of Parts A and B and the combined reactants were fed into one end of the rotating mold. The cure was completed in 5 to 10 minutes with a shell of rather dense elastomer formed on the wax within the mold. Ice water cooling on the exterior of the mold was used to cool the product which had been heated by the exothermic curing reaction. When cure was complete, the mold was removed from the lathe, stood erect and a steel shaft was centered therein. At this stage there was admixed with a second batch of the mixture of Parts A and B an amount of about 2% of tertiary butyl amine based upon the total composition. This reaction mixture was then poured in the open top of the mold (the bottom being sealed) between the outer elastomer shell and the shaft.

Upon completion of the cure, heat was applied to the exterior of the mold, the wax was melted and the roll removed. The polysulfide used was a commercially available liquid polymer having the above general formula wherein $n=6$ ("LP-3"). This polymer was a clear, amber liquid which was mobile at room temperature. Its viscosity at 25° C. in poises was from 7 to 12 and it had an average molecular weight of about 1000. Its specific gravity was 1.27 and its refractive index $n_d^{28}$ was 1.5649. The epoxy resin used was Epon 828 which has the general formula shown above wherein $n$ averages less than 1 and the average molecular weight is about 170. It was a liquid at room temperature having a viscosity from 100 to 160 poises at 25° C. The epoxide equivalent (grams of resin containing in gram-equivalent of epoxide) is 180 to 195.

While the invention has been described with particular reference to tellurium and selenium dioxide, it will be recognized that sulfur is also an element on the right-hand side of Group VI of the Periodic Table. $SO_2$ is a gas, however, and its use in accordance herewith is inconvenient; on the other hand, it has been found that certain dialkylene sulfones, e.g., divinyl sulfone, may be used in accordance herewith as the curing agent. Thus, the catalysts useful in accordance herewith may be defined as those compounds having the general formula:

$$MO_2$$

wherein M is a substituent selected from the group consisting of Te, Se, S and the radical

wherein R is an alkylene radical containing from 2 to about 8 carbon atoms and preferably from 2 to about 4. Of those catalysts, the use of $TeO_2$ and $SeO_2$ is preferred. $TeO_2$ has exhibited the most uniform results with a variety of reactants and amines and is, therefore, especially preferred.

Set forth below are the results of tests in which various catalysts and amines were employed to cause cross-linking of the polysulfide LP-3 used in Example 1 above. In each of the following examples 20 grams of LP-3 (containing 5% m-dinitrobenzene) was used and where a catalyst was present it was added as a paste in dibutyl-phthalate wherein the ratio of catalyst to dibutylphthalate was 2:1.

| Example No. | Catalyst | Amine | Temp., ° F. | Reaction Time | Nature of Product |
|---|---|---|---|---|---|
| 2 | $TeO_2$ | | 72 | 48 Hrs | No reaction. |
| 3 | $SeO_2$ | | 72 | 48 Hrs | Do. |
| 4 | $TeO_2$ | | 150 | 3 Hrs | Elastomer. |
| 5 | $SeO_2$ | | 150 | 8 Hrs | Heavy asphalt exhibited cold flow. |
| 6 | $TeO_2$ | A [1] | 72 | 3 Min | Elastomer. |
| 7 | $SeO_2$ | A | 72 | 4 Min | Do. |
| 8 | $TeO_2$ | B [2] | 72 | 5 Min | Do. |
| 9 | $SeO_2$ | B | 72 | 8 Min | Do. |
| 10 | $TeO_2$ | C [3] | 72 | 48 Hrs | No reaction. |
| 11 | $SeO_2$ | C | 72 | 48 Hrs | Do. |
| 12 | | A | 72 | 48 Hrs | Do. |
| 13 | | B | 72 | 48 Hrs | Do. |
| 14 | | C | 72 | 48 Hrs | Do. |
| 15 | | A | 150 | 8 Hrs | Do. |
| 16 | | B | 150 | 8 Hrs | Do. |
| 17 | | C | 150 | 8 Hrs | Do. |

[1] "A" is used in table to designate triethylenetetramine used in amount of 1 gram.
[2] "B" designates t-butylamine. In Examples 8 and 9 such amine was present in amount of 0.5 gram and in Examples 13 and 16 in amount of 1 gram.
[3] "C" designates dimethyl-p-toluidine, used in amount of 1 gram.

A similar test using divinyl sulfone and triethylene tetramine resulted in an elastomeric product in about 3 minutes at room temperature. It has been found that the triethylene tetramine has a tendency to bleed from the final product, which tendency t-butyl amine does not exhibit.

It has been found that the quantity of catalyst, e.g., $TeO_2$ can be reduced when m-dinitrobenzene is employed, possibly because the highly reactive hydrogen attached to the carbon atom between the two nitro groups reacts with the polysulfide to form an active species readily subject to cross-linking in the presence of the described catalysts. Thus, in the absence of m-dinitrobenzene an amount of catalyst somewhat greater than the amount of 2 to 6% previously indicated may be required.

The solid elastomeric compositions of the present invention are especially useful in the inking rolls used by lithographers, but it will be understood that they also may be employed in typographer's inking rolls as well as for other resilient surfaces in the printer's and lithographers' trades, for example in offset blankets. A relatively thin layer of such compositions on a curved metallic or other backing has been found to be especially desirable in such application. An outstanding use for the elastomeric composition of this invention is in the end sealing of inking rollers. Thus, it has been found that such compositions can be used to seal the edges or shoulders of rollers prepared from a variety of materials such as natural or synthetic rubber, etc., which are subject to attack from the solvents in inks. The seal can be formed by pouring or otherwise affixing the composition, before it has fully cured to the circular shoulders of the rollers abutting the steel shaft. The composition of this invention sets up with a strong bond to the end of any rubber or rubber-like roller and also forms a firm, fluid tight seal around the shaft. In practice it has been found desirable to add to the composition, when used for this purpose, a relatively small amount of a thickening agent to prevent run-off. Thus, a hydrated sodium silico aluminate, e.g., Zeolex 23, in an amount of about 3.2% by weight has been very useful for this purpose.

And while this invention has particular utility in the preparation of solid elastomers, applicant's process provides a new method of effecting cross-linking of fluid polysulfides to yield products ranging from those having physical characteristics varying from oils or fluids only somewhat more viscous than the original polysulfide through those resembling greases and asphalts in their appearance to the solid, non-cold flowing elastomers herein described. Reduction in the quantity of catalyst, maintenance of low reaction temperatures, and the use of the sulfones to prepare the more fluid products are all ways of obtaining such non-solid products.

Having thus described my invention, what I claim as novel and desire to protect by Letters Patent is as follows:

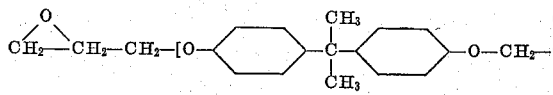

1. The process which comprises admixing a polysulfide polymer with a catalytic amount of a compound having the general formula:

$$MO_2$$

wherein M is a substituent selected from the group consisting of tellurium, selenium, sulfur and the radical

wherein R is an alkylene group containing from 2 to about 8 carbon atoms and a minor amount of an amine selected from the group consisting of primary and secondary amines and subjecting the resulting admixture to reaction conditions.

2. The process of claim 1 wherein there is admixed with the polysulfide and catalyst a small amount of a polyepoxide having the average general formula:

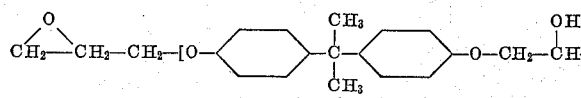

wherein $n$ is an integer from 1 to about 20, the weight ratio of polyepoxide to polysulfide present in the reaction mixture being in the range of from about 0.005 to about 0.1.

3. The process of claim 1 wherein the said compound present in a catalytic amount comprises tellurium dioxide.

4. The process of claim 1 wherein the said compound present in a catalytic amount comprises divinyl sulfone.

5. The process of claim 1 wherein the said compound present in a catalytic amount comprises selenium dioxide.

6. The process of claim1 wherein the amine comprises tertiary butyl amine.

7. A composition prepared in accordance with the process of claim 2.

8. A composition prepared in accordance with the process of claim 5.

9. An inking roller comprising the composition of claim 7.

10. An inking roller comprising the composition of claim 8.

11. The process which comprises subjecting a polysulfide having the general formula:

$$HSC_2H_4OCH_2OC_2H_4(SSC_2H_4OCH_2OC_2H_4)_n-SH$$

wherein $n$ is an integer from about 3 to about 26 to reaction conditions in the presence of a catalytic amount of a compound having the general formula:

$$MO_2$$

wherein M is a substituent selected from the group consisting of tellurium, selenium, sulfur and the radical

where R is an alkylene group containing from 2 to about 8 carbon atoms and an amine selected from the group consisting of primary and secondary amines which amine is characterized by the fact that the quotient obtained by dividing the molecular weight of said amine by the number of active hydrogens therein is a numerical value between about 15 and 200, said amine being present in an amount sufficient to significantly accelerate the reaction at room temperature.

12. The process of claim 11 in which the reaction mixture is further characterized by the following: the reaction mixture includes a polyepoxide having the formula—

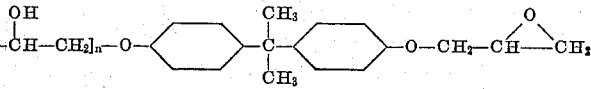

in which $n$ is from about 1 to about 20, $n$ in the general formula of the polysulfide is from 4 to about 12; the weight ratio of polyepoxide to polysulfide is in the range of from about 1 to 25 to about 1 to 40; a particulate filler in an amount equal to less than about one-fifth of the combined weight of polyepoxide and polysulfide; a compound capable of lowering the surface tension of entrapped gases is present in the reaction mixture in an amount substantially less than the said filler; the compound $MO_2$ comprises $TeO_2$, and all of the foregoing components of the reaction mixture are admixed before the amine is added thereto.

13. An inking roller comprising the composition prepared in accordance with the process of claim 12.

14. An article useful in lithography embodying an inking surface comprising the composition prepared in accordance with claim 11.

15. The process of claim 11 wherein the amine comprises tertiary butyl amine.

16. A composition prepared in accordance with the process of claim 1.

17. An article useful in lithography embodying an inking surface comprising the composition of claim 16.

References Cited in the file of this patent

UNITED STATES PATENTS

| | | |
|---|---|---|
| 2,789,958 | Fettes et al. | Apr. 23, 1957 |
| 2,875,182 | Fettes et al. | Feb. 24, 1959 |
| 2,964,503 | Carpenter et al. | Dec. 13, 1960 |

OTHER REFERENCES

Rubber Abstracts, 1958, vol. 36, No. 12, page 565.